(12) United States Patent
Kang

(10) Patent No.: US 7,375,511 B2
(45) Date of Patent: May 20, 2008

(54) ROTARY INPUT APPARATUS INCLUDING A WHEEL AND A CENTER KEY WITH SECURING GROOVES TO PREVENT ROTATION

(75) Inventor: Eung-Cheon Kang, Hwaseong-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 69 days.

(21) Appl. No.: 11/546,904

(22) Filed: Oct. 13, 2006

(65) Prior Publication Data

US 2007/0235294 A1    Oct. 11, 2007

(30) Foreign Application Priority Data

Mar. 28, 2006    (KR) ...................... 10-2006-0027796

(51) Int. Cl.
   *G01B 7/30* (2006.01)
(52) U.S. Cl. ............................... 324/207.25; 324/207.2
(58) Field of Classification Search ...............
   324/207.2–207.25, 173–174; 338/32 H, 338/32 R
   See application file for complete search history.

(56) References Cited

U.S. PATENT DOCUMENTS

| 6,396,259 | B1 * | 5/2002 | Washeleski et al. ... 324/207.22 |
| 7,095,198 | B1 * | 8/2006 | O'Brien ...................... 318/432 |
| 7,322,115 | B2 * | 1/2008 | Besier et al. ................ 33/1 PT |
| 2003/0019113 | A1 * | 1/2003 | Kofink et al. ............... 33/1 PT |
| 2005/0022617 | A1 * | 2/2005 | Sano ........................ 73/865.9 |

\* cited by examiner

Primary Examiner—Jay M Patidar

(57) ABSTRACT

A rotary input apparatus is disclosed. The rotary input apparatus comprising a wheel of circular shape having an insertion hole, a center key inserted into the insertion hole and having one or more securing grooves, a magnet joined to a surface of the wheel to co-operate with the wheel and magnetized to have alternating N- and S-poles, a detection element positioned to face the magnet for detecting the rotation of the magnet, a printed circuit board on which the detection element mounted, a base to which the printed circuit board is secured and which has one or more support protrusions that are inserted into the securing grooves, and a holder joined to the base and interposed between the wheel and the base to rotatably support the wheel, allows greater aesthetic value as the center key is not rotated and always maintains a constant orientation.

8 Claims, 7 Drawing Sheets

ROTARY INPUT APPARATUS INCLUDING A WHEEL AND A CENTER KEY WITH SECURING GROOVES TO PREVENT ROTATION

CROSS-REFERENCE TO RELATED APPLICATIONS

This application claims the benefit of Korean Patent Application No. 2006-0027796 filed with the Korean Intellectual Property Office on Mar. 28, 2006, the disclosure of which is incorporated herein by reference in its entirety.

BACKGROUND

1. Technical Field

The present invention relates to a rotary input apparatus.

2. Description of the Related Art

In general, a mobile terminal has the numbers 0-9 and the symbols * and # on a keypad of 12 keys. In addition to the numbers, there are also alphabet letters as well as consonants and vowels of Korean letters marked on such a keypad, to enable the input of information including numbers and letters. Recently, there are also navigation keys formed above the keypad equipped with a variety of functions such as phone number search, writing and managing text messages, and connecting to the Internet, etc. There are various forms of navigation keys, such as button types and rotary types, etc., but the use of rotary input apparatus is currently increasing, as they enable various functions such as menu browsing, etc.

Rotary input apparatus are used in televisions, camcorders, and PDA's (personal digital assistants), etc., as input apparatus in the form of rotary switches, rotary encoders, and rotary volume dials, etc.

In a conventional rotary input apparatus, several switches are formed on a base, and a rotational body having a center switch inserted in its center is inserted in and secured to the base. The center switch has a pressing protrusion and the rotational body has a plurality of protrusions, and the pressing protrusion and protrusions touch switches, whereby the center switch and rotational body are supported with a gap from the base.

Therefore, in such a rotary input apparatus using pressing protrusions and protrusions, the center switch and rotational body are supported entirely by the push resistance strength of the switches, so that not only is the structure weak, but also there are problems of malfunctioning due to the switches being activated even with a slight impact. Also, since the center switch is inserted in the rotational body in the conventional rotary input apparatus described above, the center switch is rotated in accordance with the rotation of the rotational body, so that if there is a text or a logo, etc., marked on the surface of the center switch, the orientation of the text or logo is changed, causing a reduction in the overall aesthetic value.

Further, another conventional rotary input apparatus is equipped with a rotating key, composed of an upper case and a lower case, and a securing button inserted in the center of the rotating key. On the reverse side of the securing button is formed a support portion, where this support portion supports the securing button while in contact with a second dome switch. Also, there is a base plate having three support portions protruding upwards, supporting the rotating key while pressing this support portion and a first dome switch attached to the reverse side of the rotating key.

However, in a rotary input apparatus comprised as above, the rotating key and securing button are supported by the push resistance strength of the first dome switch or second dome switch, respectively, so that not only is the structure unstable, but also its joining structure is weak, whereby there are problems of malfunctioning due to switches being activated even with a slight impact. In addition, since the securing button is inserted and secured in a mounting hole while being caught on a first engaging ledge of the upper case, in the conventional rotary input apparatus described above, the securing button is rotated simultaneously with the rotation of the rotating key. Therefore, if there is a text or a logo, etc., marked on the surface of the securing button, the orientation of the text or logo is changed, causing a reduction in the overall aesthetic value.

Also, a conventional rotary input apparatus is not equipped with a light emitting device, so that not only is it inconvenient to use at night, but also it is lacking in aesthetic value.

SUMMARY

The present invention aims to provide a rotary input apparatus with which the rotation of the center key is prevented.

The invention also aims to provide a rotary input apparatus in which the wheel and center key are firmly supported to prevent malfunctions.

One aspect of the invention provides a rotary input apparatus comprising a wheel of circular shape having an insertion hole, a center key inserted into the insertion hole and having one or more securing grooves, a magnet joined to a surface of the wheel to co-operate with the wheel and magnetized to have alternating N- and S-poles, a detection element positioned to face the magnet for detecting the rotation of the magnet, a printed circuit board on which the detection element mounted, a base to which the printed circuit board is secured and which has one or more support protrusions that are inserted into the securing grooves, and a holder joined to the base and interposed between the wheel and the base to rotatably support the wheel.

Embodiments of the rotary input apparatus may have one or more of the following features. For example, a plurality of dome buttons may be formed on the printed circuit board, and push protrusions may be formed on the wheel and the center key for pressing the dome buttons. The holder may have a center hole formed adjacent to a ledge, with a washer having one or more rotation holes inserted onto the center hole, and the wheel may have one or more securing protrusions that are inserted and secured in the rotation holes.

The center hole may be confined by a perimeter protruding upwards, with the wheel inserted onto the center hole in contact with the perimeter, and the printed circuit board may have one or more holes through which the support protrusions may be inserted. The holder may have one or more support holes for holding at least a portion of the detection element, and the holder may comprise a body portion having the center hole, an inclination portion protruding from the body portion and having a particular inclination, and a securing portion extending from an end of the inclination portion and secured to the base. Also, a particular tolerance may be formed between an end of the support protrusion and the bottom surface of the securing groove.

Additional aspects and advantages of the present invention will be set forth in part in the description which follows and in part will be obvious froth the description, or may be learned by practice of the invention.

DETAILED DESCRIPTION

Below, embodiments of the rotary input apparatus according to the invention will be described in more detail with reference to the accompanying drawings. In the description with reference to the accompanying drawings, those components are rendered the same reference number that are the same or are in correspondence regardless of the figure number, and redundant explanations are omitted.

Figure 1:
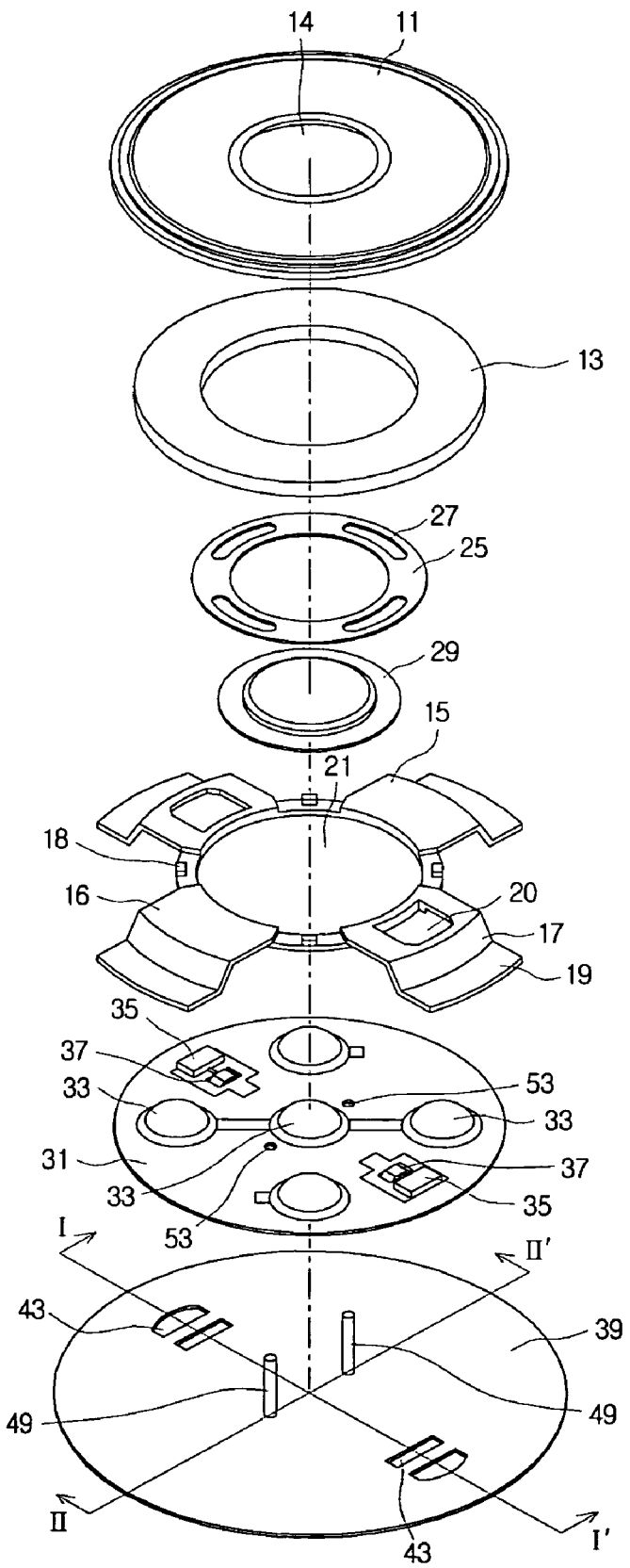
FIG. 1 is a perspective view of a rotary input apparatus in an unassembled state according to an embodiment of the invention.
Figure 2:
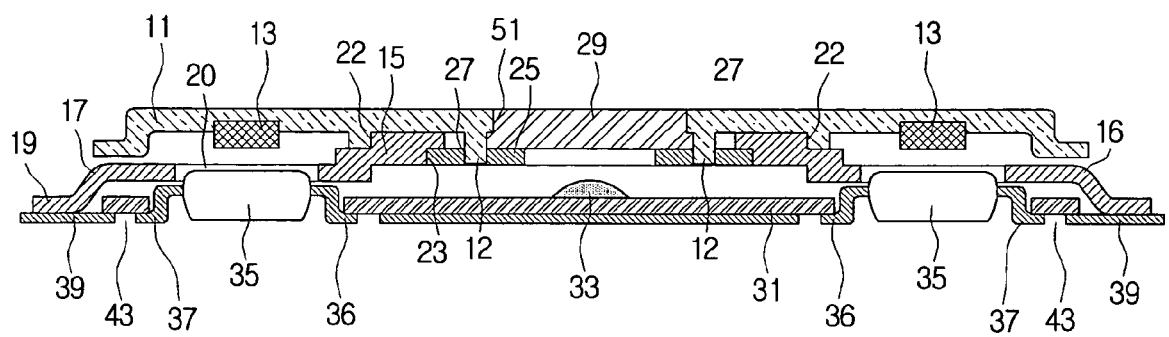
FIG. 2 is a cross-sectional view of the rotary input apparatus in an assembled state across line I-I' of FIG. 1.
Figure 3:
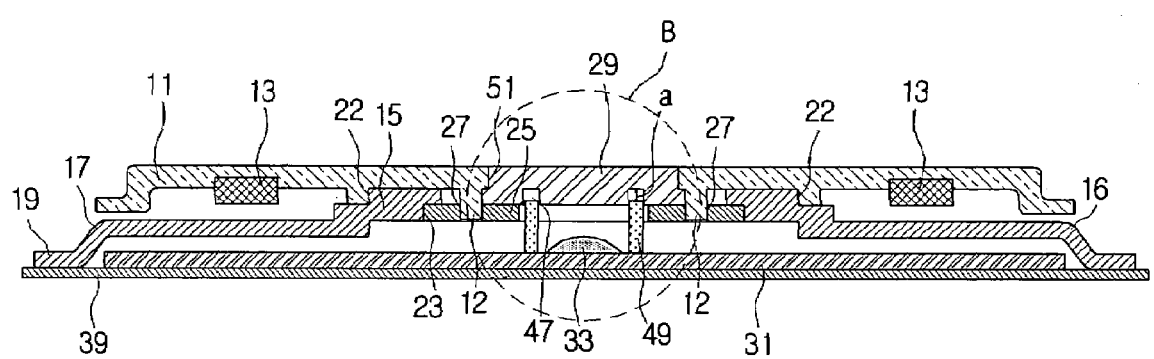
FIG. 3 is a cross-sectional view of the rotary input apparatus in an assembled state across line II-II' of FIG. 1.

Referring to FIGS. 1 to 3, a rotary input apparatus according to an embodiment of the invention comprises a rotatably joined wheel 11, a washer 25 which secures the wheel 11 to a holder 15, a center key 29 joined at the center of the wheel 11, a ring-shaped magnet 13 secured to the bottom of the wheel 11 which rotates together with the wheel 11, the holder 15 joined directly to the upper surface of a base 39 which rotatably supports the wheel 11, a printed circuit board 31 secured to the upper surface of the base 39, and Hall sensors 35 positioned in grooves of the printed circuit board 31 which are detection elements for sensing the rotation of the magnet 13. In order to prevent the rotation of the center key 29, there are support protrusions 49 protruding upwards on one side of the base 39, where the support protrusions 49 are inserted into securing grooves 47 on the reverse side of the center key 29 to prevent the rotation of the center key 29.

Since, in the rotary input apparatus according to this embodiment, the support protrusions 49 are inserted into the securing grooves 47 formed on the reverse side of the center key 29, the center key 29 is not rotated in spite of the rotation of the wheel 11. Therefore, in cases where there is a logo or a text marked on the surface of the center key 29, the aesthetic value may increased, as the center key 29 is not rotated.

Also, since the rotary input apparatus according to this embodiment has the wheel 11 and the center key 29 secured by the holder 15 which is secured to the base 39, not only is it more solid compared to conventional rotary input apparatus, but also the dome switch 33 is activated only by definite pressing so that malfunctioning is avoided. Further, as the holder 15 which rotatably supports the wheel 11 is made of metal and secured directly on the base 39, it is returned to its original position by means of the elasticity of the holder 15 after the external force is removed, to provide a better tactile feel.

On the printed circuit board 31 having the Hall sensors 35, i.e. the detection elements, there are receiving holes 37 formed, in which at least portions of the Hall sensors 35 can be positioned, so that the thickness of the rotary input apparatus may be reduced by the thickness of a receiving hole 37. Also, by additionally forming insertion holes 43 on the base 39 in which may be positioned the Hall sensors 35, i.e. the detection elements, the thickness of the rotary input apparatus may further be reduced by the thickness of an insertion hole 43.

The wheel 11 is generally shaped as a circular plate, with an insertion hole 14 formed in the center through which the center key 29 may be inserted. The wheel 11 has a plurality of securing protrusions 12 adjacent to the insertion hole 14 that protrude downwards. As the securing protrusions 12 are inserted into the rotation holes 27 of the washer 25, the wheel 11 is rotatably secured to the holder 15. On the bottom surface of the wheel 11 is secured the magnet 13, which is magnetized to have multiple poles. The wheel 11 is rotated together with the magnet 13 by user operation, whereby a variety of inputs are made as the Hall sensors 35 sense the rotation angle, direction, and speed, etc., of the magnet 13. Also, a portion may be pressed by the user, so that a push protrusion formed on the reverse side of the holder 15 presses the upper surface of a dome button 33 to activate a separate function.

As illustrated in FIGS. 2 and 3, there is a ledge 51 formed adjacent to the securing protrusions 12 around the insertion hole 14 of the wheel 11, where the center key 29 is caught on the ledge 51 so that the center key 29 is prevented from being detached. Also, since there is a particular gap (not shown) at the interface between the center key 29 and the wheel 11, the wheel 11 can be rotated in spite of the center key 29 which is secured by the support protrusions 49 and is not rotated.

The securing protrusions 12, as illustrated in FIG. 2, are inserted through the center hole 21 of the holder 15 and the rotation holes 27 of the washer 25, with the ends processed such that they are not detached from the rotation holes 27. The washer 25 is inserted and secured onto the center of the holder 15, whereby the wheel 11 is' secured to the holder 15. The central angles of the rotation holes 27 through which the securing protrusions 12 are inserted define the angle by which the wheel 11 is able to rotate.

The magnet 13 is attached to the bottom surface of the wheel 11 to be rotated together with the wheel 11, and such rotation of the magnet 13 is sensed by the Hall sensors 35 for an input based on the rotation angle. The magnet 13 has the shape of a ring magnetized to have alternating N- and S-poles, and the- Hall sensors 35 are able to detect the rotation angle, direction, and speed of the wheel 11 according to the changes in N- and S-poles above the Hall sensors 35.

The holder 15 is secured to one side of the base 39 and rotatably supports the wheel 11. The holder 15 may be made of metal, such as stainless steel, etc., so that when the particular force applied on the wheel 11 is removed, the wheel 11 is returned to its original position due to the elasticity of the holder 15 itself. The holder 15 may be formed by press processing, etc. Of course, the holder 15 may also be formed by plastics, etc., that are high in elasticity.

The holder 15 includes a ring-shaped body portion 18, and a support portion 16 protruding from the perimeter of the body portion 18 and secured to a side of the base 39. The body portion 18 has a center hole 21 in the middle, and the support portion 16 protruding in four directions around the center hole 21 comprises an inclination portion 17 protruding downwards in a particular inclination, and a securing portion 19 extending horizontally from the end of the inclination portion 17.

The inclination portion 17 protrudes outwards and connects the body portion 18 and the securing portion 19. Since the inclination portion 17 is formed by metal, etc., having elasticity, when an external force applied on the holder 15 is removed, the holder 15 is returned to its original position by means of the elasticity of the inclination portion 17. Thus, even when a particular portion of the wheel 11 is pressed so that the wheel 11 becomes tilted, this elasticity allows it to be restored to its original position. The securing portion 19 extends from the end of the inclination portion 17 and is secured to the upper surface of the base 39 to secure the holder 15. The securing portion 19 may be secured to the base 39 by means of adhesive or tape, etc.

Since the holder 15 is secured directly to a side of the base 39 by means of adhesive, etc., the rotary input apparatus according to this embodiment has superior endurance to external impact. Also, the elasticity of the holder 15, which is formed of metal, allows not only the holder 15 itself but also the wheel 11 to be restored to their original positions, to provide a better tactile feel.

In the support portion 16 are formed support portion holes 20. As illustrated in FIG. 2, a portion of the Hall sensor 35, i.e. the sensing means, may be positioned in the support portion hole 20. Also, the body portion 18 has ledges. 23 formed adjacent to the center hole 21.

The support portion holes 20 in the support portion 16 are formed to correspond with the Hall sensors 35 mounted on the printed circuit board 31, and as illustrated in FIG. 2, hold portions of the Hall sensors 35. The center hole 21 is formed in the center of the holder 15. Also, the wheel 11 is rotatably inserted onto a perimeter 22 forming the center hole 21, to prevent the wheel 11 from becoming detached. The ledges 23, as illustrated in FIGS. 2 and 3, are formed adjacent to the center hole 21. The washer 25 is inserted and secured onto the ledges 23.

As illustrated in FIG. 1, the washer 25 is generally shaped as a donut, with a plurality of rotation holes 27 formed in certain intervals along the ring. The washer 25 is inserted and secured onto the ledges 23 to define the angle by which the wheel 11 is able to rotate. While there are four arc-shaped rotation holes 27 illustrated in this embodiment, the invention is not thus limited, and it is to be appreciated that the number and central angles of the rotation holes 27 may be changed according to design considerations. For example, one or two rotation holes 27 formed along the ring of the washer 25 with a central angle of 180° or 360° may be used for the rotation holes 27.

After the center key 29 is inserted through the insertion hole 14 of the wheel 11, it is caught on the ledge 51, with a particular tolerance formed between the outer perimeter of the center key 29 and the inner perimeter of the insertion hole 14 so as to allow the rotation of the wheel 11. The center key 29 is pressed by the user to perform a particular function, e.g. connecting to the Internet or receiving DMB (Digital Multimedia Broadcasting), etc.

Figure 4:
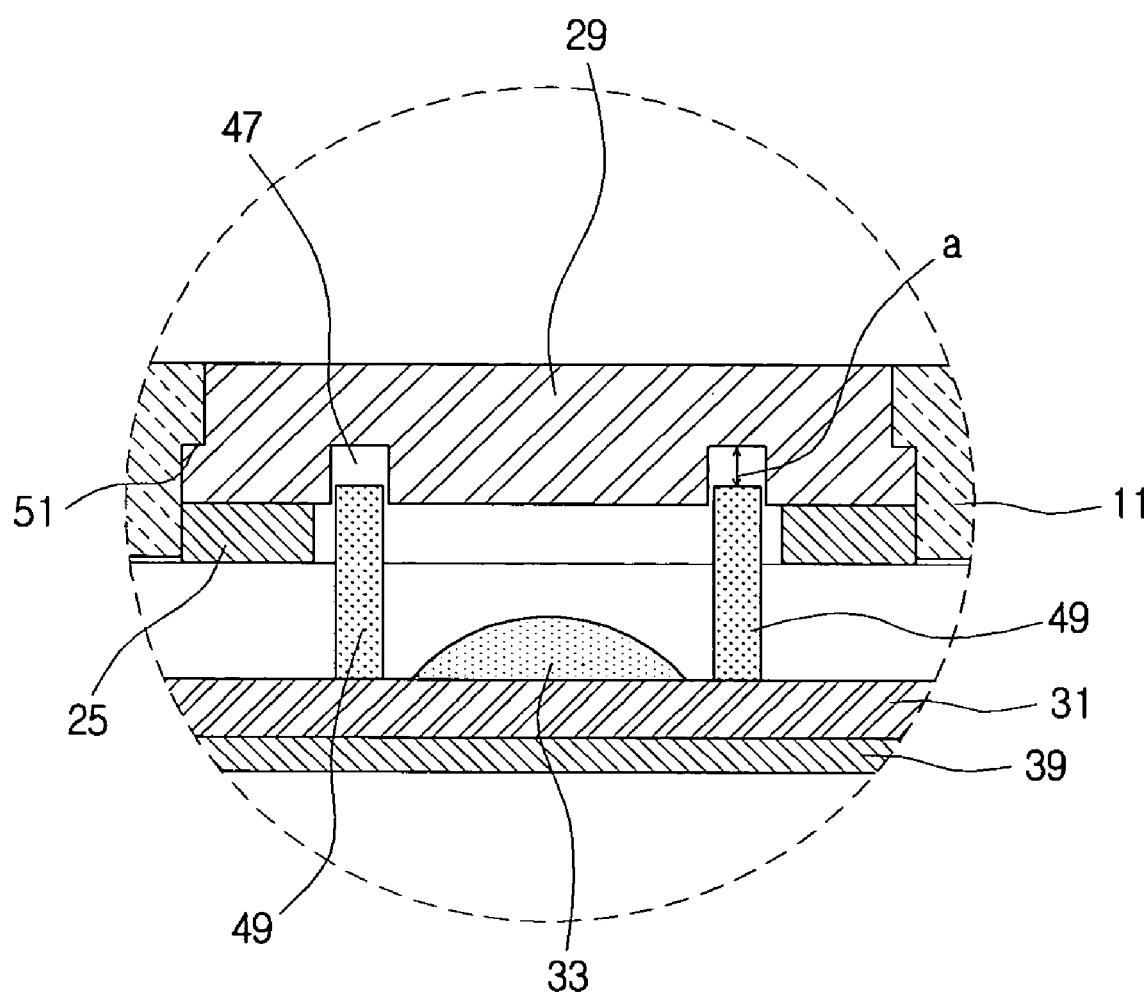
FIG. 4 is a magnified cross-sectional view of portion "B" of FIG. 3.

On the reverse side of the center key 29, as illustrated in FIGS. 3 and 4, are formed securing grooves 47, in which portions of the support protrusions 49 are inserted to prevent the rotation of the center key 29. The securing grooves 47 are formed in correspondence with the positions and number of the support protrusions 49. Also, to allow the center key 29 to move downwards by a certain distance when pressed, there is a particular tolerance (a) formed between the bottom surface of the of the securing groove 47 and the end of the support protrusion 49. The tolerance (a) is greater than the vertical moving distance of the center key 29.

The printed circuit board 31 has the shape of a circular plate in correspondence with the base 39, with a plurality of dome buttons 33 formed on one side in correspondence with the push protrusions formed on the reverse side of the holder 15. Also, there are receiving holes 37 formed on the printed circuit board 31 in which at least portions of the Hall sensors 35 may be inserted. The printed circuit board 31 is formed with a diameter somewhat shorter than the diameter of the base 39, in order to allow a sufficient area where the securing portion 19 of the holder 15 may be secured.

Also formed on the printed circuit board 31 are holes 53 through which the support protrusions formed on the base 39 may be inserted. By inserting the support protrusions 49 through the holes 53, the printed circuit board 31 is joined to the base 39 more firmly.

The dome buttons 33 are pressed by push protrusions (not shown) formed on the reverse side of the holder 15 to perform separate functions. While in this embodiment the dome buttons 33 are illustrated as being pressed by means of the wheel 11, the invention is not thus limited, and any composition may be used in which certain pressing performs separate functions. For example, pressure sensors or contact sensors may also be used instead of the dome buttons 33.

The receiving holes 37 are formed on the printed circuit board 31 in correspondence with the support portion holes 20 of the holder 15, and as illustrated in FIGS. 2 and 3, at least portions of the Hall sensors 35 are positioned in the receiving holes 37. Thus, compared to the case of mounting Hall sensors 35 on the upper surface of the printed circuit board 31, the thickness of the input device in the present embodiment may be reduced by the by the thickness of a receiving hole 37.

The detection element may be a Hall sensor (Hall effect sensor), which is a silicon semiconductor using the effect of electromotive forces being generated when electrons experience the Lorentz force in a magnetic field and their direction is curved. The Hall sensors generate electromotive forces that are proportional to the rotation of the magnet 13 attached to the wheel 11, which are transferred via the printed circuit board 31 to an outside control unit (not shown).

Of course, the detection element is not limited to Hall sensors, and any element may be used which can detect the rotation of the magnet 13. For example, MR (magneto-resistive) sensors or GMR (giant magneto-resistive) sensors may be used for the detection element. An MR sensor or a GMR sensor is an element of which the resistance value is changed according to changes in the magnetic field, and utilizes the property that electromagnetic forces curve and elongate the carrier path in a solid to change the resistance. Not only are MR sensors or GMR sensors small in size with high signal levels, but also they have excellent sensitivity to allow operation in low-level magnetic fields, and they are also superior in terms of temperature stability.

When the detection element consists of Hall sensors 35, the Hall sensors 35 are secured to the printed circuit board 31 by leads 36, where the leads 36 are inserted through the insertion holes 43 of the base 39 and secured to the reverse side of the printed circuit board 31.

The base 39, as illustrated in FIG. 1, has the shape of a circular plate, and rotatably supports the holder 15 and the wheel 11. The diameter of the base 39 is formed to be somewhat longer than that of the printed circuit board 31. Also, insertion holes 43 are formed on the base 39 in correspondence with the receiving holes 37 of the printed circuit board 31. As illustrated in FIG. 3, portions of the Hall sensors 35 are positioned in the insertion holes 43, whereby the thickness of the rotary input apparatus may further be reduced by the thickness of the insertion holes 43.

Figure 5:
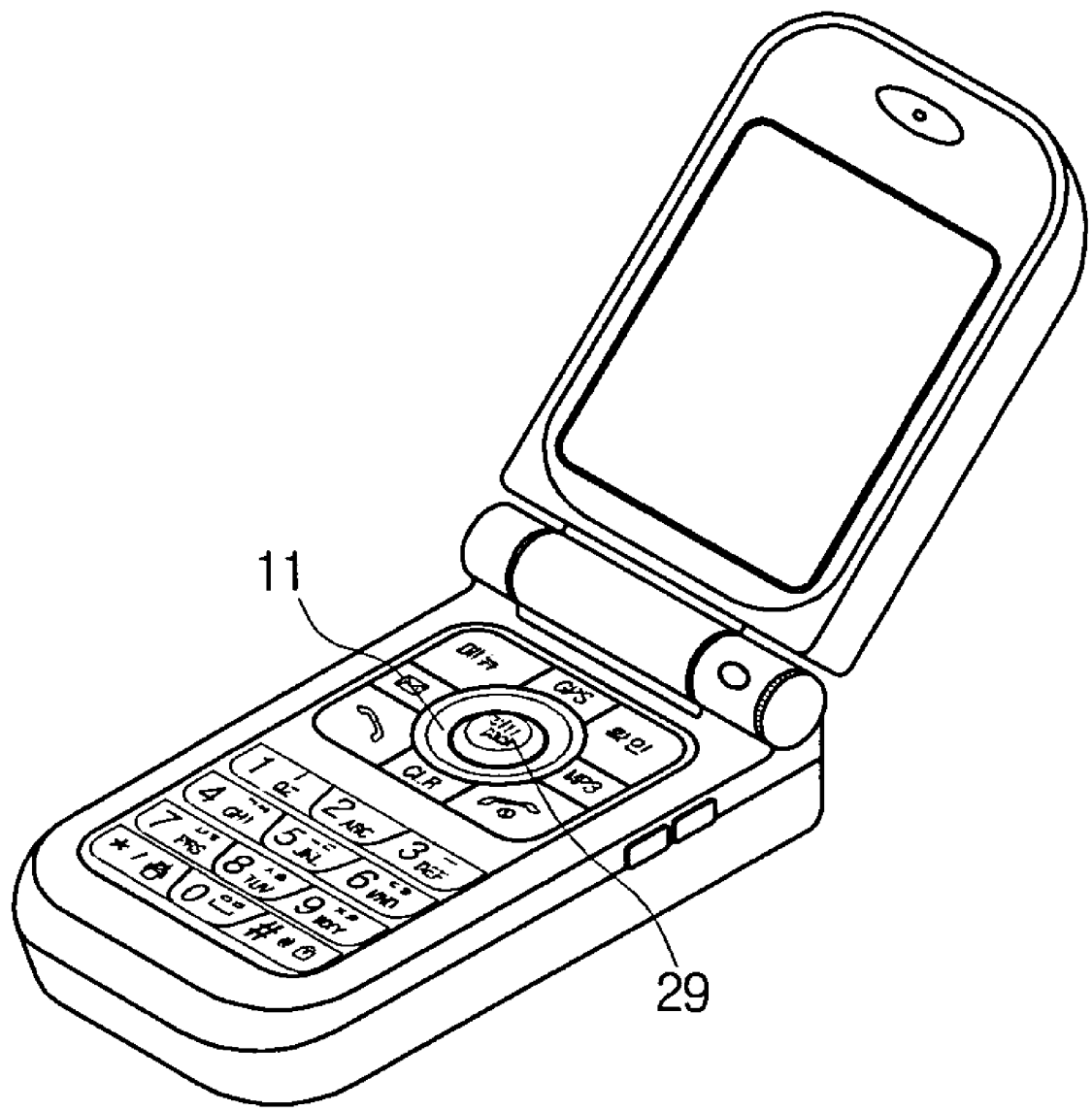
FIG. 5 is a perspective view illustrating the state in which a logo marked on the surface of the center key is not rotated even with the rotation of the wheel, in a mobile terminal having a rotary input apparatus according to an embodiment of the invention.

A pair of support protrusions 49 protruding upwards are formed on a side of the base 39, and portions of the support protrusions 49 are inserted in the securing grooves 47 to prevent the rotation of the center key 29. Thus, as illustrated in FIG. 5, in cases where there is a text or a logo marked on the surface of the center key 29, the center key 29 is not rotated in cooperation with the rotation of the wheel 11. Therefore, as the text or logo marked on the surface of the center key 29 is always kept at a constant orientation, its aesthetic quality may be maintained.

Below, a description will be given of the operation of a rotary input apparatus according to the present embodiment.

When a rotational force is applied by a user on an outer side of the center key 29, the wheel 11 is rotated while inserted onto the perimeter 22 of the holder 15, which causes the magnet 13 to rotate together with the wheel 11. As the magnet 13 has a multiple number of alternately magnetized N- and S-poles, the Hall sensors 35 can sense the changes in poles due to the rotation of the magnet 13, to recognize the rotation direction, speed, and angle of the wheel 11. The Hall sensors 35 generate output signals corresponding to the rotation direction, rotation angle, and rotation speed of the wheel 11, which are transmitted via the printed circuit board 31 to an outside control unit, and the control unit identifies the output signals to perform an input corresponding to the rotation of the wheel 11.

Also, when an outer side of the center key 29 is pressed by a user, the wheel 11 is tilted in one direction while elastically supported by the holder 15, which causes the push protrusions (not shown) formed on the reverse side of the holder 15 to press the dome buttons 33. This allows each of the dome buttons 33 positioned on the printed circuit board 31 to perform its own function. For example, in the input apparatus illustrated in FIGS. 1 to 3, there are four dome buttons 33 in equal intervals that can be pressed by the push protrusions, where each dome button 33 may function as a hot key for launching a text message function, searching phone numbers, connecting to the Internet, or receiving satellite broadcasts, etc. In addition, the center key 29 may also perform a separate function when pressed by a user.

The user may execute another function by pressing the center key 29 formed in the center. While the center key 29 cannot be rotated because of the support protrusions 49, it can be moved in a vertical direction because of the tolerance (a) formed between the ends of the support protrusions 49 and the bottom surfaces of the securing grooves 47.

Below, a description will be given of a rotary input apparatus according to another embodiment of the invention, with reference to FIGS. 6 and 7.

Figure 6:
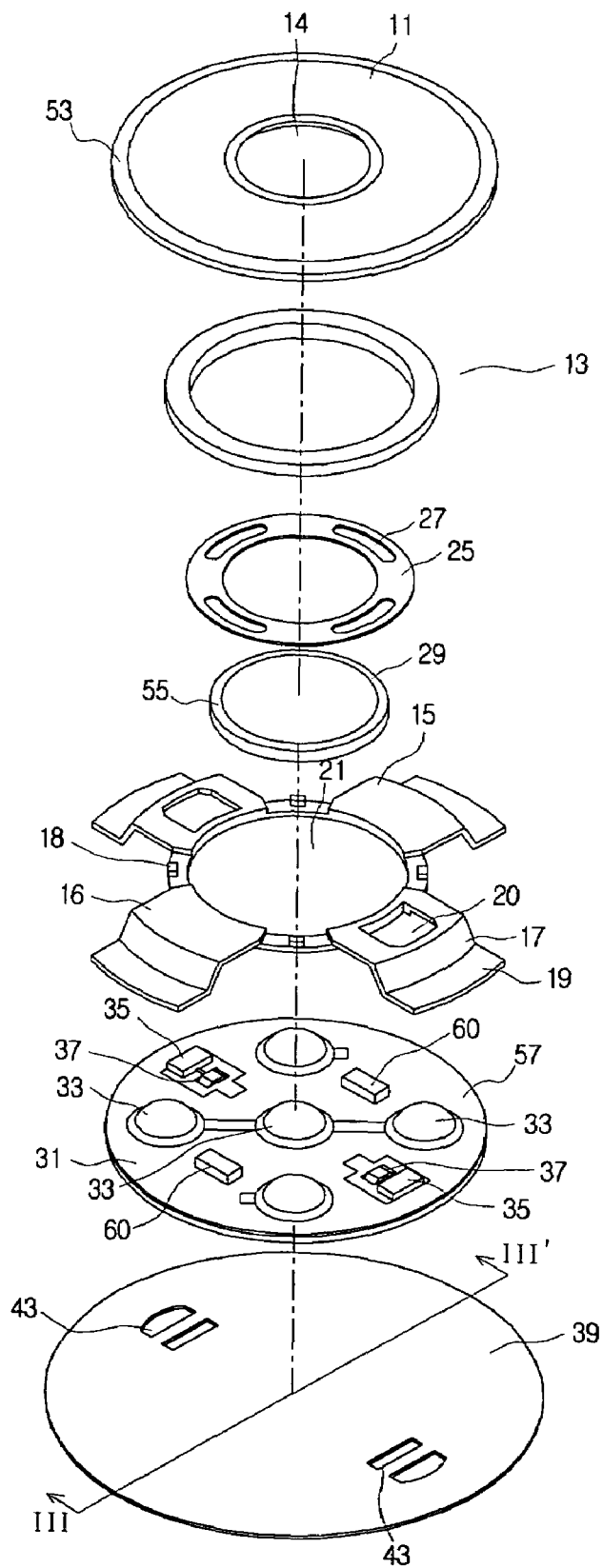
FIG. 6 is an exploded perspective view of a rotary input apparatus having a light emitting element attached on the printed circuit board, according to another embodiment of the invention.
Figure 7:
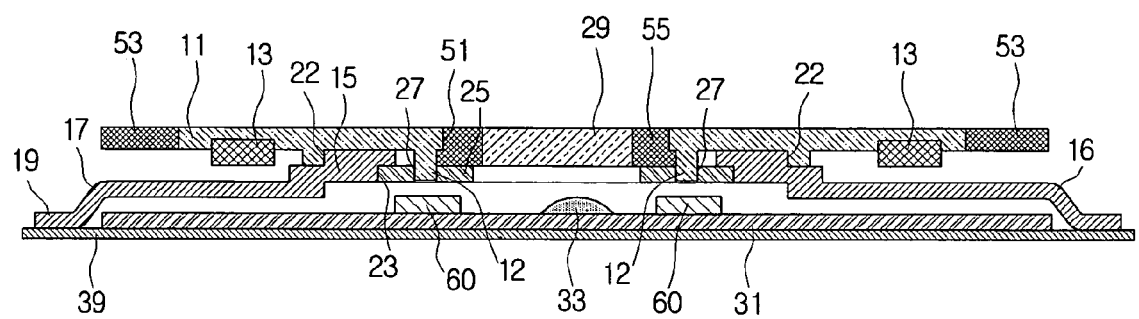
FIG. 7 is a cross-sectional view of a rotary input apparatus across line III-III' of FIG. 6.

Referring to FIGS. 6 and 7, while the rotary input apparatus according to another embodiment of the invention is almost identical to the rotary input apparatus illustrated in FIG. 1, they are different in that there are light emitting elements 60 mounted and a reflective sheet 57 stacked on the printed circuit board 31. The rotary input apparatus according to this embodiment is also different from the previous embodiment in that a center light transmission portion 55 is formed on the rim of the center key 29, and a wheel light transmission portion 53 is formed on the rim of the wheel 11.

As the joining composition and operation of the present embodiment having light emitting elements 60 are almost identical to those of the embodiment illustrated in FIG. 1, the description below will focus only on the differences.

The light emitting elements 60 are mounted on the printed circuit board 31, and with the input of control signals and an electrical current via the printed circuit board, project light to the wheel light transmission portion 53 and center light transmission portion 55. When the wheel 11 and the center key 29 are manufactured from transparent materials such as transparent ABS (acrylonitrile butadiene styrene), the light emitting elements 60 also project light through the wheel 11 and the center key 29 to the exterior. Light emitting diodes (LED's), organic EL (electroluminescence), etc., may be used for the light emitting elements 60, but they are not thus limited.

There may be one or two or more light emitting elements 60 included on the printed circuit board 31. Also, the light emitting elements 60 may be mounted on a region of the printed circuit board 31 corresponding to the inner portion of the wheel 11I that is, the region within half the radius of the wheel 11 from the center of the wheel 11, in order to prevent fire spots. If the light emitting elements 60 were to be mounted in the outer portion of the printed circuit board 31, fire spots may occur, which give the appearance that light is gathered only at the portions where the light emitting elements 60 are positioned.

The light from the light emitting elements 60 are projected through the wheel light transmission portion 53 formed on the rim portion of the wheel 11 and through the center light transmission portion 55 formed on the rim portion of the center key 29 to the exterior. The wheel light transmission portion 53 and the center light transmission portion 55 correspond to the portions around the wheel 11 and the center key 29 where transparent materials have been formed by double molding. When the wheel 11 and/or the center key 29 are manufactured from transparent materials such as transparent ABS (acrylonitrile butadiene styrene), the light from the light emitting elements 60 may also pass through the wheel 11 and the center key 29 to be projected to the exterior.

In order to diffuse the light from the light emitting elements 60, a reflective sheet 57 may be stacked on the printed circuit board 31. A reflective surface is formed on the face of the reflective sheet 57, and the light from the light emitting elements 60 is reflected by the reflective surface and projected to the exterior through the wheel light transmission portion 53 or the center light transmission portion 55, so that diffusion of the light is facilitated. A plurality of grooves are formed on the reflective sheet 57 in which to insert the dome buttons 33, Hall sensors 35, and light emitting elements 60.

Referring to FIG. 7, while the washer 25, which secures the wheel 11 to the holder 15, has the same composition as that in the embodiment illustrated in FIG. 1, it may be manufactured with a metal having excellent surface illuminance, to further facilitate the diffusion of the light from the light emitting elements 60. Examples of such a metal having excellent surface illuminance may include copper or aluminum, etc. Of course, the washer 25 is not limited to those made of metal, and it is to be appreciated that any composition may be used in which light from the light emitting elements 60 is reflected and diffused to the exterior, for example, laminating a reflective film on the surface.

The present invention can thus provide a rotary input apparatus with which the rotation of the center key is prevented.

The invention can also provide a rotary input apparatus in which the wheel and the center key are firmly supported to prevent malfunctions.

While the above description has pointed out novel features of the invention as applied to the embodiments disclosed above, it is to be construed that various permutations and modifications are included within the scope of the present invention.

What is claimed is:

1. A rotary input apparatus, comprising:
   a wheel of circular shape having an insertion hole;
   a center key inserted into the insertion hole and having one or more securing grooves;
   a magnet joined to a surface of the wheel to co-operate with the wheel and magnetized to have alternating N- and S-poles;
   a detection element, positioned to face the magnet, for detecting the rotation of the magnet;
   a printed circuit board having the detection element mounted thereon;
   a base having the printed circuit board secured thereto and having one or more support protrusions inserted into the securing grooves; and
   a holder joined to the base and interposed between the wheel and the base to rotatably support the wheel.

2. The rotary input apparatus of claim 1, wherein the printed circuit board has a plurality of dome buttons, and the wheel and the center key have push protrusions formed thereon for pressing the dome buttons.

3. The rotary input apparatus of claim 1, wherein the holder has a center hole formed adjacent to a ledge, a washer having one or more rotation holes is inserted onto the center hole, and the wheel has one or more securing protrusions inserted and secured in the rotation holes.

4. The rotary input apparatus of claim 3, wherein the center hole is confined by a perimeter protruding upwards, and the wheel is inserted onto the center hole in contact with the perimeter.

5. The rotary input apparatus of claim 3, wherein the holder comprises a body portion having the center hole, an inclination portion protruding from the body portion and having a particular inclination, and a securing portion extending from an end of the inclination portion and secured to the base.

6. The rotary input apparatus of claim 1, wherein the printed circuit board has one or more holes through which the support protrusions are inserted.

7. The rotary input apparatus of claim 1, wherein the holder has one or more support holes for holding at least a portion of the detection element.

8. The rotary input apparatus of claim 1, wherein a particular tolerance is formed between an end of the support protrusion and the bottom surface of the securing groove.

* * * * *